United States Patent [19]

Seiferling

[11] Patent Number: 4,569,037
[45] Date of Patent: Feb. 4, 1986

[54] APPARATUS FOR DETERMINING THE DISTANCE FROM A PREDETERMINED POINT TO A TARGET

[75] Inventor: James E. Seiferling, Rio Vista, Calif.

[73] Assignee: Blackwelders, Rio Vista, Calif.

[21] Appl. No.: 469,005

[22] Filed: Feb. 23, 1983

[51] Int. Cl.⁴ .............................................. G01S 15/08
[52] U.S. Cl. ....................................... 367/108; 367/13
[58] Field of Search ................... 367/13, 97, 108, 151, 367/908

[56] References Cited

U.S. PATENT DOCUMENTS

| | | | |
|---|---|---|---|
| 3,271,730 | 9/1966 | Stedtnitz | 367/97 |
| 3,748,637 | 7/1973 | Larson et al. | 367/151 |
| 4,210,969 | 7/1980 | Massa | 367/108 |
| 4,254,482 | 3/1981 | Newman | 367/97 |
| 4,323,992 | 4/1982 | Tobin, Jr. | 367/108 |

Primary Examiner—Richard A. Farley
Attorney, Agent, or Firm—Owen, Wickersham & Erickson

[57] ABSTRACT

Method and apparatus for determining the distance from a preselected point to a target. An electrostatic ultrasonic transducer in a special protective housing is used with a single-pulse, square-wave transmitter to compare a main signal with a calibration signal. A warning signal indicates when the number of signals actually received during each one hundred signals sent drops below a predetermined percentage. Noise is minimized by careful spacing and shaping of the calibration bar and by insulating foam in the housing.

8 Claims, 7 Drawing Figures

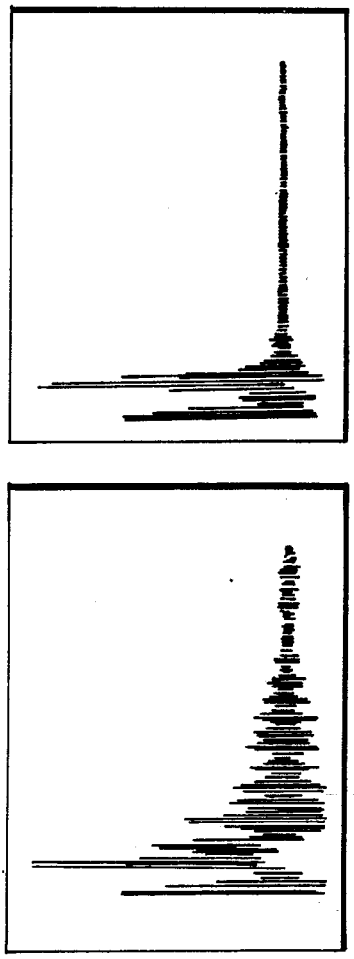
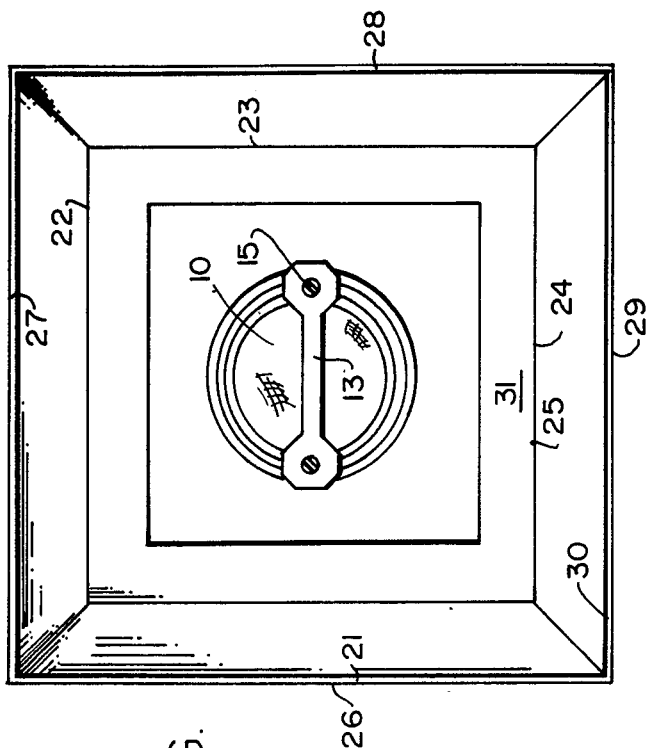
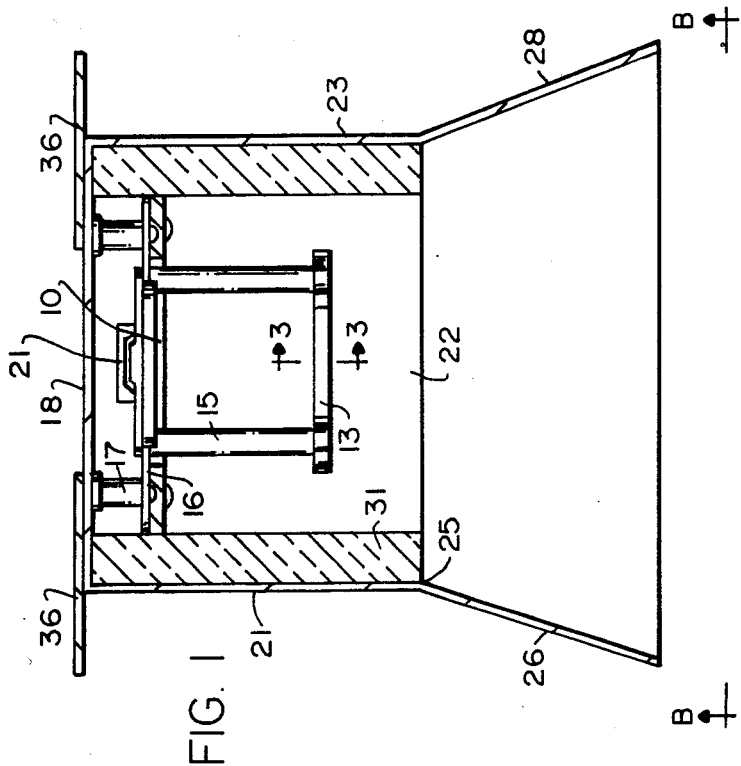

APPARATUS FOR DETERMINING THE DISTANCE FROM A PREDETERMINED POINT TO A TARGET

This invention relates to an improved ultrasonic distance-determining method and apparatus.

BACKGROUND OF THE INVENTION

The ultrasonic device shown and described in U.S. patent application Ser. No. 363,644, filed Mar. 30, 1982, now abandoned, in general, proved excellent for determining certain distances. In that invention, an electrostatically generated ultrasonic signal is directed from a preselected point toward a target and also to a calibration bar located closer to the preselected point then the target and at a known distance from it.

Reflection signals are received back from the target and calibration bar, the time delay between reception of the signals, due to the different distances involved, is determined and converted into the corresponding target distance. Preferably the transducer is actuated by single-pulse, electronic square wave.

In processing the reflected signals, that invention sets a noise level less than the amplitude of the reflected signals and large enough to cover unwanted responses, and compared the signals with the set noise level, passing only signals exceeding that noise level.

However, when that invention was installed on tomato harvesters and operated in the field certain problems developed. One of these problems appears to be related to the dust abounding in the fields; this sometimes became severe, preventing the device from consistently doing its job accurately.

Another problem was that the device did not seem to be sufficiently sheltered, not only from the dust that was stirred up by the machine on which it was mounted, but also from things that might drop down from above.

Another problem, which may or may not be related to the others, was that a great deal of noise and blurring occurred in the received or reflected signals, so that it became difficult for the responding circuits to respond accurately.

All these problems are solved, or at least mollified, by the present invention.

Objects of this invention are: to obtain improvement in the operation of the basic device, to provide for better sheltering of the transducer, to provide an improved calibration bar for the device that provides better response characteristics, and to provide a system that eliminates most if not all of the noise that was obscuring the signals obtained in the prior invention. In addition, an object of the present invention is to warn the operator when the efficiency of operation of the device has decreased whether because of accummulated dirt or for other reasons, so that fewer signals are actually being received than is tolerable under the circumstances.

SUMMARY OF THE INVENTION

Like the invention described and claimed in application Ser. No. 363,644, the present invention provides method and apparatus for determining the distance from a preselected point to a target. Like the invention, the present invention employs a protective housing having one closed end and one open end and an electrostatic ultrasonic transducer in the housing, having a mount supported by the closed end. The transducer directs an ultrasonic signal along the central axis of the housing and out though its open end toward the target and it receives a reflected signal back from the target. A calibration bar is spaced at a known distance along the central axis from the transducer and reflects back to the transducer a fraction of its signal.

Unlike that previous invention, the present invention does not employ a wave guide tube inside the housing. In its place, it provides insulating and energy-absorbent foam inside the housing, secured to the side walls of the housing and covering those walls from the closed end wall to a distance well beyond the calibration bar.

Further, the enclosure walls of the housing are parallel to said central axis to a point further from that closed wall than the calibration means, and then they flare outwardly to an end edge about three times as far from the transducer as the calibration bar.

The calibration bar itself is novel in that its surface facing the transducer comprises two rectangular flat portions meeting at about 45 degrees, one flat portion being parallel to the transducer and the other inclining inwardly toward it.

In addition, the present invention determines the efficiency of the device in receiving the reflected signals, as measured by the number of reflected signals not received. When this efficiency has declined to a predetermined level, the invention then produces a warning signal indicating that degree of lowered efficiency.

BRIEF DESCRIPTION OF THE DRAWINGS

FIG. 1 is a view in side elevation and in section of an ultrasonic device according to the principles of the invention.

FIG. 2 is a bottom view looking up into the device of FIG. 1.

FIG. 3 is a view in section of the calibration bar of FIGS. 1 and 2, taken along the line 3—3 in FIG. 1.

FIG. 6 is a CRT display illustrating an example of a reception signal obtained with a device using a totally flat calibration bar and a metal waveguide tube, according to the previous invention.

FIG. 7 is a similar display showing the much clearer signal obtained by the present invention.

DETAILED DESCRIPTION OF A PREFERRED EMBODIMENT

Figure 4:
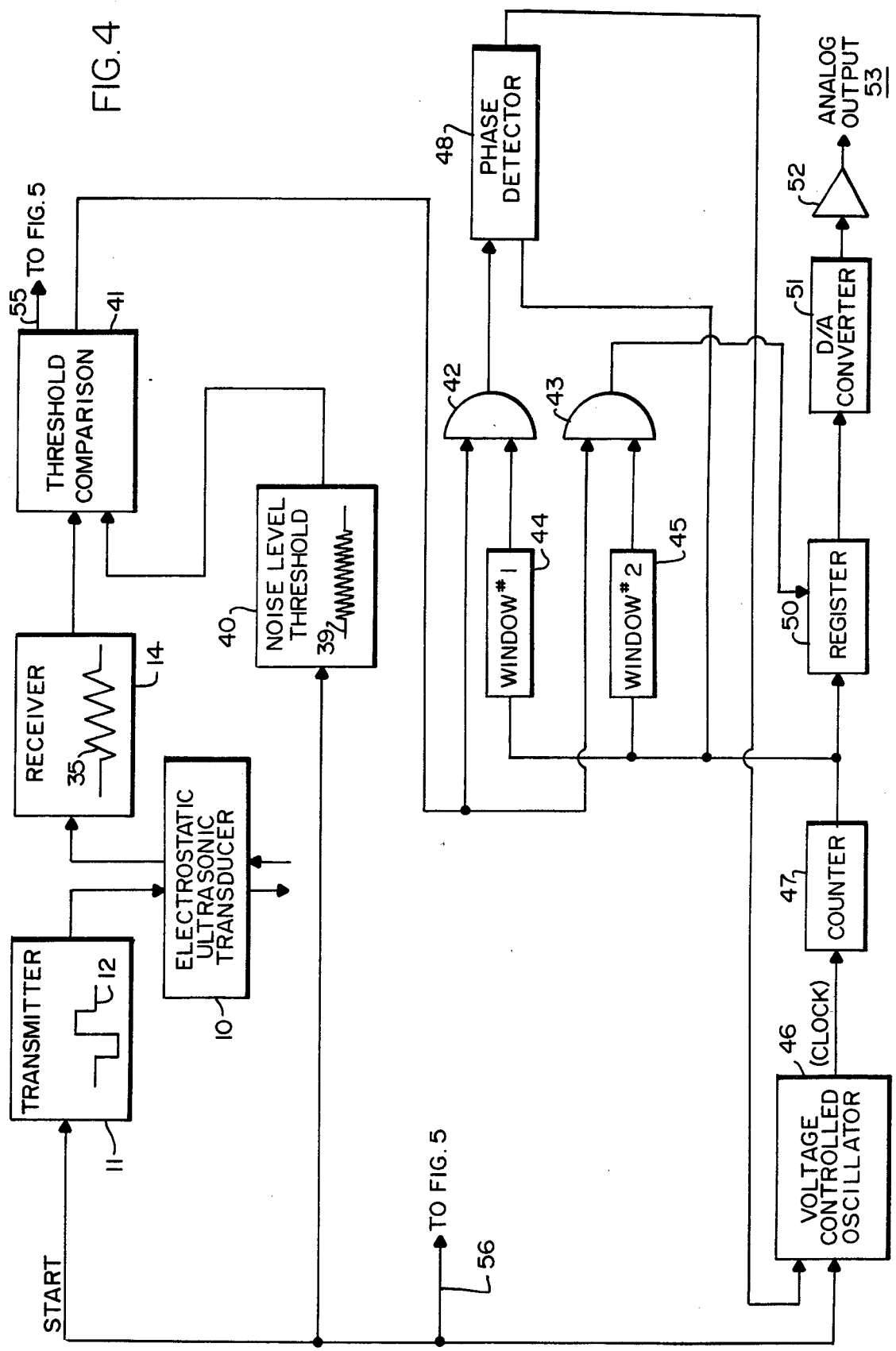
FIG. 4 is a circuit diagram for the distance-determining circuit.

As in Ser. No. 363,644, an electrostatic transducer 10 employs an electrical signal from a transmitter 11 (FIG. 4) to generate an ultrasonic pulse. The transmitter 11 generates a single electronic pulse in the form of a square wave 12, which the electrostatic transducer 10 (e.g., one made by Polaroid for its cameras) transforms into the ultrasonic pulse. A small fraction of the pulse energy goes only to a calibration bar 13 (FIGS. 1-3) and is reflected back to the transducer 10 from there. The transducer 10, on receipt of this signal, produces an electrical signal which is sent to a receiver 14 (FIG. 4). The distance of the calibration bar 13 from the transducer 10 is determined by a pair of spacers 15 (FIGS. 1 and 2) that support the bar 13 and are themselves supported by a top panel 16 which supports the transducer 10.

Most of the energy from the ultrasonic pulse goes to the target and is reflected back to the transducer 10, whence a second electrical pulse is sent to the receiver 14. The reflection from the bar 13 returns to the transducer 10 much more quickly than the reflection from the target, the times being proportional to the distance from the transducer 10. The time delay between the signal from the bar 13 and that from the target corresponds to the distance of the transducer 10 from the target. The electronic circuit calculates the distance from the transducer 10 to the target as a multiple of the distance from the transducer 10 to the calibration bar 13. All this, so far, is as in application Ser. No. 363,644.

The panel 16 may be itself supported by screws 17 securing it to a top wall 19 of an enclosure 20, which may be square, with vertical side walls 21, 22, 23, and 24, extending down to an edge 25 lying well beyond the calibration bar 25. To help exclude dust and other foreign material more effectively, the vertical walls 21, 22, 23, and 24 may be succeeded by outwardly flaring walls 26, 27, 28, and 29 leading from the edge 25 to an outer edge 30, which lies about three times as far from the transducer 10 as the calibration bar 13.

Formerly, a wave guide tube was used inside the enclosure 20, but I have found that this gave rise to unwanted reflection noise in the resultant signals to be received. In place of this, I provide the interior surfaces of the wall 21, 22, 23, and 24 with thick foam-type insulation material 31 extending to the cage 25, about 150% the distance between the transducer 10 and the calibration bar 13.

Also, I find that reception is improved by making the calibration bar 13 in the shape shown in FIG. 3, where there is a flat rectangular surface portion 32 parallel to the transducer 10 followed by an inclined rectangular surface portion 33 at a 45 degree angle to the flat portion 32. The portion 32 may be 0.060" wide, and the total width of the bar 13 may be 0.120".

FIG. 6 shows a cathode-ray tube display of a signal obtained using the device of application Ser. No. 363,644, wherein considerable noise and obfuscation is introduced, apparently by the metal waveguide tube and calibration bar that was nearly flat, having the surface facing the transducer 10 nearly parallel to it, but inclined at an angle of 4.5 degrees.

FIG. 7 shows the much cleaner CRT display obtained with the present invention, wherein the waveguide tube is eliminated and the enclosure 20 is made as shown in FIGS. 1 and 2 and as described above; also the calibration bar 13 is as shown in FIG. 3 and as described above.

Additional support for the transducer 10 may be provided by a clamp (not shown) which has ends secured to the enclosure 20. The top wall 19 of the enclosure 20 may be welded to plates 36, which may be used to attach the whole to some suitable support.

As shown in FIG. 4, which is basically the same as in application Ser. No. 363,644, the electronic transmitter 11 (which may be any of several types of appropriate sub-circuits) generates the single-pulse square wave 12 and actuates the transducer 10 to generate a similar ultrasonic pulse. The reflections, first, from the bar 13 and, second, from the target are, as said, converted into an electrical wave train and sent to the receiver 14. However, the single pulse results in a short series of reflected oscillations 35 that are no longer square. For use in determining the time lapse between the first and second reflections, it is desired to take into account only the very first such wave of each reflection. To eliminate much of the noise, a noise level threshold 39 is decided on, and a circuit 40 therefor is connected to a circuit 41 enabling threshold comparison between that threshold and the received pulse reflections, i.e., the first wave having amplitude greater than the threshold marking the vertical time.

The resultant first waves then are sent to first and second AND gates 42 and 43. Each of these gates is provided with a suitable window circuit 44 or 45, and these are open only from a time very little earlier than the earliest time at which the first reflection could come to a short time past the latest time it could occur. The second window 45 does not open until a significantly long interval thereafter, a time representing the closest time at which the target reflection could possibly be received, and it closes after the longest possible time to initiate and receive such a reflection. This portion of the circuit may be called an input conditioner, since it uses a pair of one-shots to mask unwanted pulses on the received pulse line.

In a timing generator portion of the circuit, a voltage-controlled oscillator 46 generates a series of clock pulses and sends them to a counter circuit 47. If everything acts at the normal time interval, the first reflection reaches the threshold comparator 41 at a particular count from the counter 47, e.g. at count 256. If it reaches these at an earlier count, say 253, then the counter 47 is too slow, and the oscillator 46 should be somewhat speeded up proportionally; if this signal occurs at a later count, say 259, it would be too fast, and the oscillator 46 should be slowed down proportionally. This is done with the aid of a phase detecting circuit 48, the input for which is connected to the first AND gate 42 and to the counter 47 output, and the output from the phase detector 48 is connected back to the oscillator 46, thereby making any needed adjustment, due to variance from the standard temperature, for example.

The corrected counter 47 continues to send pulses to a register circuit 50 which receives the pulse signal from the second AND gate 43, thereby actuating the register 50 at the count when the ground reflection signal is received and sent to the second AND gate 43, e.g. at a count of 5360.

When the pulse signal from the second AND gate 43 actuates the register 50, the information from the counter 47 (which is exactly proportional to distance) is stored in the register 50, for example, when the bar 13 is exactly ten centimeters from the transducer 10, $$\frac{\text{count } 256}{10 \text{ cm}} = \frac{\text{count } 5360}{\text{distance to target in cm.}}$$

$$\text{Distance to target} = \frac{5360}{25.6 \text{ cm.}} = 209.375 \text{ cm.}$$

The register 50 may, if desired, then send this distance in digital form to a digital-to-analog converter 51, which may send its output to an amplifier 52, from which comes an amplified analog output 53.

Basically, the invention thus determines the distance of the ultrasonic transducer 10 from the target. It may then send its analog output to a suitable device, such as a calculating circuit or an energizing circuit adjusting some mechanical part.

The use of the electrostatic transducer 10 enables one to eliminate most of the circuitry that would be required when a crystal transducer is used to produce the ultrasonic pulse.

As stated earlier, there have been problems in the present invention with its efficiency of operation. Apparently, many times the receiving signal is not received once the device, such as the transducer itself, becomes coated with a light film of dust. In any event, whatever may be the cause, the present invention provides the improvement of warning the operator so that he can then replace the dirty transducer assembly with another clean one. The original one may be treated to enable its re-use or may simply be discarded, if that is desirable. Its total cost is small, considering the use in the field having to be closely tied in with the ripeness of the crop.

Figure 5:
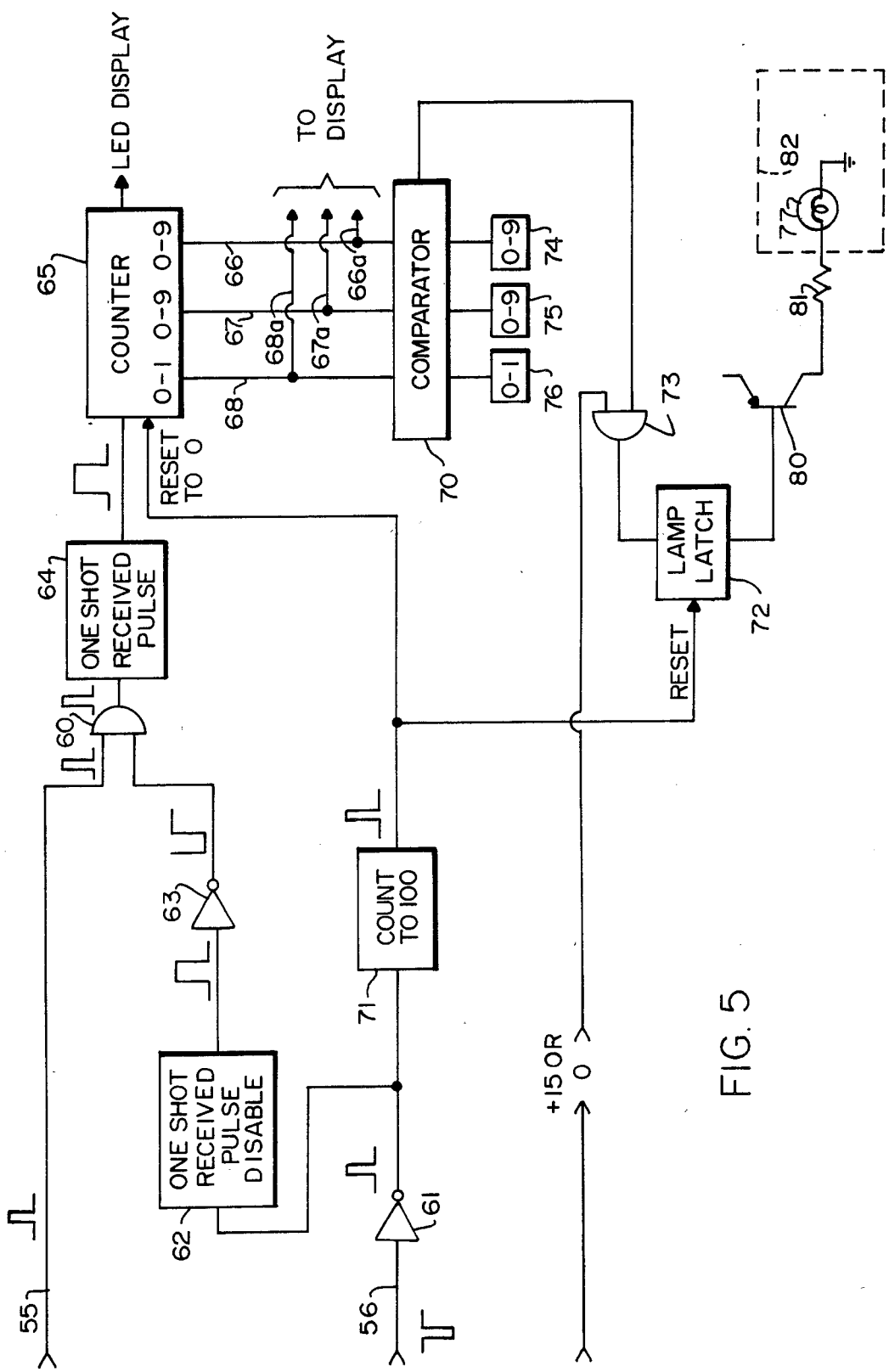
FIG. 5 is a circuit diagram for the efficiency determining and warning circuit.

In this warning circuit which is shown in FIG. 5, reference will first be made to two points in FIG. 4. There it will be seen that a threshold comparison signal 55 is sent to FIG. 5, and that a start signal 56 is also sent to FIG. 5, where the same numbers indicate the incoming signals 55 and 56, respectively. The threshold comparison output signal 55 is preferably only the pulse for the first crossing of the threshold, and other subsequent signals are cut off by the threshold comparison device. The signal 55 itself is preferably a square wave about 10 microseconds wide, although there may be some variation in that. This signal is applied to an AND gate 60. The start signal 56 is sent to an inverter 61. The starting signal will typically be a 13-microsecond pulse, and, of course, the inverter 61 does nothing but invert that signal. The typical pulse is emitted every 16 to 20 microseconds. One branch of the output from the inverter 61 is sent to a one-shot multi-vibrator 62 which is used to disable the calibration signal and provide a 0.6 microsecond window. The disabling signal then goes to another inverter 63 where it is inverted and sent to the AND gate 60. The AND gate 60 under the appropriate AND conditions sends its output to a one-shot multi-vibrator 64, which takes the received pulse, i.e., the target pulse, converts it to an 8-microsecond square wave pulse and sends that to a counter 65, so that the counter 65 counter 65 counts only the number of target signals or, in other words, only the number of pairs of signals, each pair being a calibration signal eliminated at the AND gate 60 and its corresponding target signal that is passed by the AND gate 60. The counter provides three outputs, for the units, tens, and hundreds digits along lines 66, 67, 68, sending all of those to a comparator 70. Branch lines 66a, 67a, and 68a lead to the display unit via suitable BCD to decimal convertors, so that the display is digital. If desired, only two displays need be driven, since from 99% one goes only to 100% without having to go beyond that.

The other signal from the inverter 61 goes to another counter 71, which counts up to 100, and at every hundredth pulse sends a reset signal to the counter 65. It also sends a reset signal to a lamp latch 72.

The drive to turn on the unit comprises, preferably, a 15-volt power source, which may be a battery, and supplies +15 volts when the unit should be counting, otherwise supplying no voltage. No voltage is applied when the device which is employing the circuit is not being operated, so that those signals are eliminated. This power drive goes to an AND gate 73.

The comparator 70 drives three BCD switches 74, 75, and 76 for setting a trip point. The comparator 70 compares the value that it should get with each one hundred counts, in other words, when the count to 100 device 71 disables the counter 65 and resets it to 0, the counter 65 will, if everything is going all right, have counted one hundred pulses itself. The comparator 70 compares how many counts it actually gets with the one hundred count reset value, and if, for example, the comparator 70 indicates that it counted only 89 pulses, then its efficiency is down by 11% to 89%. Thus, for each one hundred pulses a value is obtained.

The comparator 70 also has an output which is set in accordance with a desired level, at and by the BCD Switches 74, 75, and 76 to indicate (as by lighting a warning lamp) whether the efficiency of the device is considered to be still satisfactory. If, say, it is set to be satisfactory at an efficiency of, say, 62% and unsatisfactory below that, then the comparator 70 will put out its signal to indicate when the efficiency is below that 62%. In other words, any count below 62 at the completion of the one hundred counts send a signal from the comparator 70 to the AND gate 73. If the AND gate 73 receives this signal, and at the same time a signal showing that the 15-volt signal is applied, then it applies that signal to the lamp latch 72, which holds the lamp on until a resetting signal comes at the end of the next one hundred counts of the counter 71.

The lamp latch 72 then sends an output signal to the base of a transistor 80 which is connected through a resistance 81 to an indicator lamp 82 on the operator's console. When the lamp 82 is lighted, the operator knows that at least one such signal has come, if the lamp 82 is repeatedly lighted as a regularly repeated signal, then that indicates that the efficiency of the device is indeed too low. At that time he considers immediate replacement of the transducer and its attached apparatus.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:
1. Apparatus for determining the distance from a preselected point to a target, including in combination:
 a perspective housing having a closed end and an enclosure having walls extending out from said closed end and ending a substantial distance therefrom at an open end, said housing having a central axis extending from said closed end to said open end,
 electrostatic ultrasonic transducer means in said housing supported by said closed end at said preselected point for directing an ultrasonic signal along said central axis out through said open end toward said target and for receiving a reflection signal back therefrom,
 single-pulse, square-wave transmitter means connected to said transducer for actuating it to send said ultrasonic signal,
 calibration means spaced at a known distance along said central axis from said preselected point in the path of said ultrasonic signal for reflecting back to said transducer means a fraction of said signal,
 spacer means secured to said mount and to said calibration means and providing the spacing between them at said known distance, said known distance being less than one third of the distance from said closed end to said open end,
 protective foam inside said housing secured to the walls of said enclosure and covering those walls from said closed end to a distance beyond said calibration means, receiving means connected to said transducer means for receiving both reflected signals with a time delay between them due to the different distances which the ultrasonic signals have to travel, timing means for determining the magnitude of said time delay, and converting means for converting the time delay into the corresponding distance causing said time delay.

2. The apparatus of claim 1 wherein said enclosure walls are parallel to said central axis to a point further from said closed end than said calibration means and then flare outwardly.

3. The apparatus of claim 1 wherein said calibration means comprises a bar secured to said spacer means, said bar having a surface facing said closed end, said surface having two rectangular flat portions meeting at about 45 degrees, one said flat portion being parallel to said closed end and the other inclining outwardly therefrom toward said open end.

4. In apparatus for determining the distance from a preselected point to a target, the combination of a protective housing having a closed end and an enclosure, having walls, extending out from said closed end and ending a substantial distance therefrom at an open end, said housing having a central axis extending from said closed end to said open end, electrostatic ultrasonic transducer means in said housing and having a mount supported by said closed end at said preselected point for directing an ultrasonic signal along said central axis out through said open end toward said target and for receiving a reflection signal back therefrom, calibration means spaced at a known distance along said central axis from said preselected point in the path of said ultrasonic signal for reflecting back to said transducer means a fraction of said signal, spacer means secured to said mount and to said calibration means and providing the spacing between them at said known distance, said known distance being less than one third of the distance from said closed end to said open end, and protective foam inside said housing secured to the walls of said enclosure and covering those walls from said closed end to a distance beyond said calibration means.

5. The combination of claim 4 wherein said enclosure walls are parallel to said central axis to a point further from said closed end than said calibration means and then flare outwardly.

6. The combination of claim 4 wherein said calibration means comprises a bar secured to said spacer means, said bar having a surface facing said closed end, said surface having two rectangular flat portions meeting at about 45 degrees, one said flat portion being parallel to said closed end and the other inclining outwardly therefrom toward said open end.

7. Method for determining the distance in air from a preselected point to a target, including in combination:

electrostatically generating a series of ultrasonic signals from a single-pulse, electronic square wave at a said preselected point, sending out and directing each said ultrasonic signal toward said target and producing a main reflection signal back therefrom, intercepting a portion of each said ultrasonic signal at a known distance from said preselected point and reflecting it back to said preselected point as a calibration signal, receiving both said reflected signals, which have a time delay between them due to the different distances which the ultrasonic signals have to travel, determining the magnitude of said time delay, and converting the magnitude of time delay into the corresponding distance causing said time delay, counting the signals sent out up to one hundred and then beginning a new such count repeatedly, counting the number of signals received for each hundred sent, producing a warning signal indicating when the number of signals received during each one hundred signals sent drops below a predetermined percentage.

8. Method for determining the distance in air from a preselected point to a target, including in combination:

electrostatically generating a series of ultrasonic square wave pulse signals at said preselected point, sending out and directing said ultrasonic signal toward said target and producing a main reflection signal back therefrom, intercepting a portion of said ultrasonic signal at a known distance from said preselected point and reflecting it back to said preselected point as a calibration signal, receiving both said reflected signals, which have a time delay between them due to the different distances which the ultrasonic signals have to travel, comparing the number of pairs of reflected signals received with the number of signals sent, and producing a warning signal indicating when the fraction of pulse pairs received drops below a predetermined percentage of signals sent.

* * * * *

UNITED STATES PATENT AND TRADEMARK OFFICE
CERTIFICATE OF CORRECTION

PATENT NO. : 4,569,037
DATED : February 4, 1986
INVENTOR(S) : James E. Seiferling It is certified that error appears in the above-identified patent and that said Letters Patent are hereby corrected as shown below:

Column 5, line 38, delete the second occurrence or repetition of "counter 65".

Column 6, line 14, "send" should read --sends--.

Column 6, line 41, "perspective" should read --protective--.

Signed and Sealed this

Tenth Day of June 1986

[SEAL]

Attest:

DONALD J. QUIGG

Attesting Officer

Commissioner of Patents and Trademarks